US012737857B2

(12) United States Patent
Shi et al.

(10) Patent No.: US 12,737,857 B2
(45) Date of Patent: Sep. 15, 2026

(54) JOINT VIDEO STABILIZATION AND MOTION DEBLURRING

(71) Applicant: Google LLC, Mountain View, CA (US)

(72) Inventors: Fuhao Shi, San Jose, CA (US); Mauricio Delbracio, Sunnyvale, CA (US); Chia-Kai Liang, Mountain View, CA (US); Damien Martin Kelly, Fremont, CA (US); Peyman Milanfar, Menlo Park, CA (US)

(73) Assignee: GOOGLE LLC, Mountain View, CA (US)

( * ) Notice: Subject to any disclaimer, the term of this patent is extended or adjusted under 35 U.S.C. 154(b) by 366 days.

(21) Appl. No.: 18/550,997

(22) PCT Filed: Jul. 22, 2021

(86) PCT No.: PCT/US2021/042751
§ 371 (c)(1),
(2) Date: Sep. 18, 2023

(87) PCT Pub. No.: WO2023/003556
PCT Pub. Date: Jan. 26, 2023

(65) Prior Publication Data
US 2024/0169498 A1 May 23, 2024

(51) Int. Cl.
*G06T 5/73* (2024.01)
*H04N 23/68* (2023.01)

(52) U.S. Cl.
CPC ........... *G06T 5/73* (2024.01); *H04N 23/6812* (2023.01); *G06T 2207/20201* (2013.01)

(58) Field of Classification Search
USPC ........................................................... 182/255
See application file for complete search history.

(56) References Cited

U.S. PATENT DOCUMENTS

| | | | | |
|---|---|---|---|---|
| 8,396,321 | B1 | 3/2013 | Aldrich | |
| 2008/0309777 | A1* | 12/2008 | Aoyama | G06V 10/507 348/222.1 |

(Continued)

FOREIGN PATENT DOCUMENTS

| | | |
|---|---|---|
| EP | 2574038 | 3/2013 |

OTHER PUBLICATIONS

International Preliminary Report on Patentability for Application No. PCT/US2021/042751, mailed Feb. 1, 2024, 20 pages.

(Continued)

*Primary Examiner* — Chineyere Wills-Burns
*Assistant Examiner* — Aaron Timothy Bonansinga
(74) *Attorney, Agent, or Firm* — DORITY & MANNING, P.A.

(57) ABSTRACT

Systems and methods for real-time image deblur and stabilization can utilize sensor data for estimating motion blur without the high computational cost of image analysis techniques. The estimated motion blur can then be utilized to generate a motion blur kernel for image correction. The systems and methods can further refine the correction by processing the motion blur kernel with a polynomial filter to generate a sharpening kernel. The systems and methods can provide for real-time correction even with minimal to no stabilization masking.

19 Claims, 12 Drawing Sheets

(56) References Cited

U.S. PATENT DOCUMENTS

| | | | | |
|---|---|---|---|---|
| 2013/0132044 | A1* | 5/2013 | Paris | G02C 7/028 703/2 |
| 2015/0147047 | A1* | 5/2015 | Wang | G06T 5/73 386/280 |
| 2015/0206289 | A1 | 7/2015 | Wang et al. | |
| 2016/0188998 | A1* | 6/2016 | Cho | G06F 18/23 382/195 |
| 2017/0064204 | A1 | 3/2017 | Sapiro et al. | |
| 2019/0104255 | A1 | 4/2019 | Fuhao et al. | |
| 2019/0122378 | A1* | 4/2019 | Aswin | G06V 20/647 |
| 2020/0007770 | A1* | 1/2020 | Shi | H04N 23/6812 |
| 2020/0137300 | A1* | 4/2020 | Ogawa | H04N 23/64 |
| 2020/0265567 | A1* | 8/2020 | Hu | G06T 5/50 |
| 2021/0133928 | A1* | 5/2021 | Ding | G06T 3/40 |
| 2021/0314474 | A1* | 10/2021 | Yang | G06T 5/50 |
| 2022/0321830 | A1* | 10/2022 | Niklaus | G06N 3/09 |
| 2022/0392021 | A1* | 12/2022 | Sinha | G06N 3/0464 |
| 2024/0371185 | A1* | 11/2024 | Sadek | G06V 10/761 |

OTHER PUBLICATIONS

Bell et al., "A non-linear filter for Gyroscope-based video stabilization", Sep. 1, 2014, ECCV 2014, Part IV, LNCS 8692, pp. 294-308.

Delbracio et al., "Polyblur: Removing Mild Blur by Polynomial Reblurring", arxiv.org, Dec. 17, 2020, XP081840172, 10 pages.

Erhel et al., "Least-Squares Polynomial Filters for Ill-Conditioned Linear SystemS", Jul. 2001, 30 pages.

International Search Report for Application No. PCT/US2021/042751, 5 pages, mailed on May 27, 2022.

Liang et al., "Fused Video Stabilization on the Pixel 2 and Pixel 2 XL", Nov. 10, 2017, https://blog.research.google/2017/11/fused-video-stabilization-on-pixel-2.html, retrieved on Sep. 5, 2023, 10 pages.

Zhang et al., "Intra-Frame Deblurring by Leveraging Inter-Frame Camera Motion", Oct. 15, 2015, 9 pages.

* cited by examiner

500

APPLYING MOTION BLUR TO MITIGATE JUDDER ARTIFACTS

502

504

GENERATE SENSOR DATA, WHEREIN THE SENSOR DATA IS DESCRIPTIVE OF MOTION OCCURING DURING AN EXPOSURE TIME — 602

DETERMINE AN ESTIMATED MOTION BLUR BASED ON THE SENSOR DATA — 604

DETERMINE A MOTION BLUR KERNEL TO CORRECT MOTION BLUR FOR THE IMAGE CAPTURED DURING THE EXPOSURE TIME BASED ON THE ESTIMATED MOTION BLUR — 606

PROCESS THE MOTION BLUR KERNEL WITH ONE OR MORE POLYNOMIAL FILTERS TO GENERATE A SHARPENING KERNEL — 608

OBTAIN THE IMAGE CAPTURED DURING THE EXPOSURE TIME — 610

GENERATE AN AUGMENTED IMAGE BY APPLYING THE SHARPENING KERNEL TO THE IMAGE — 612

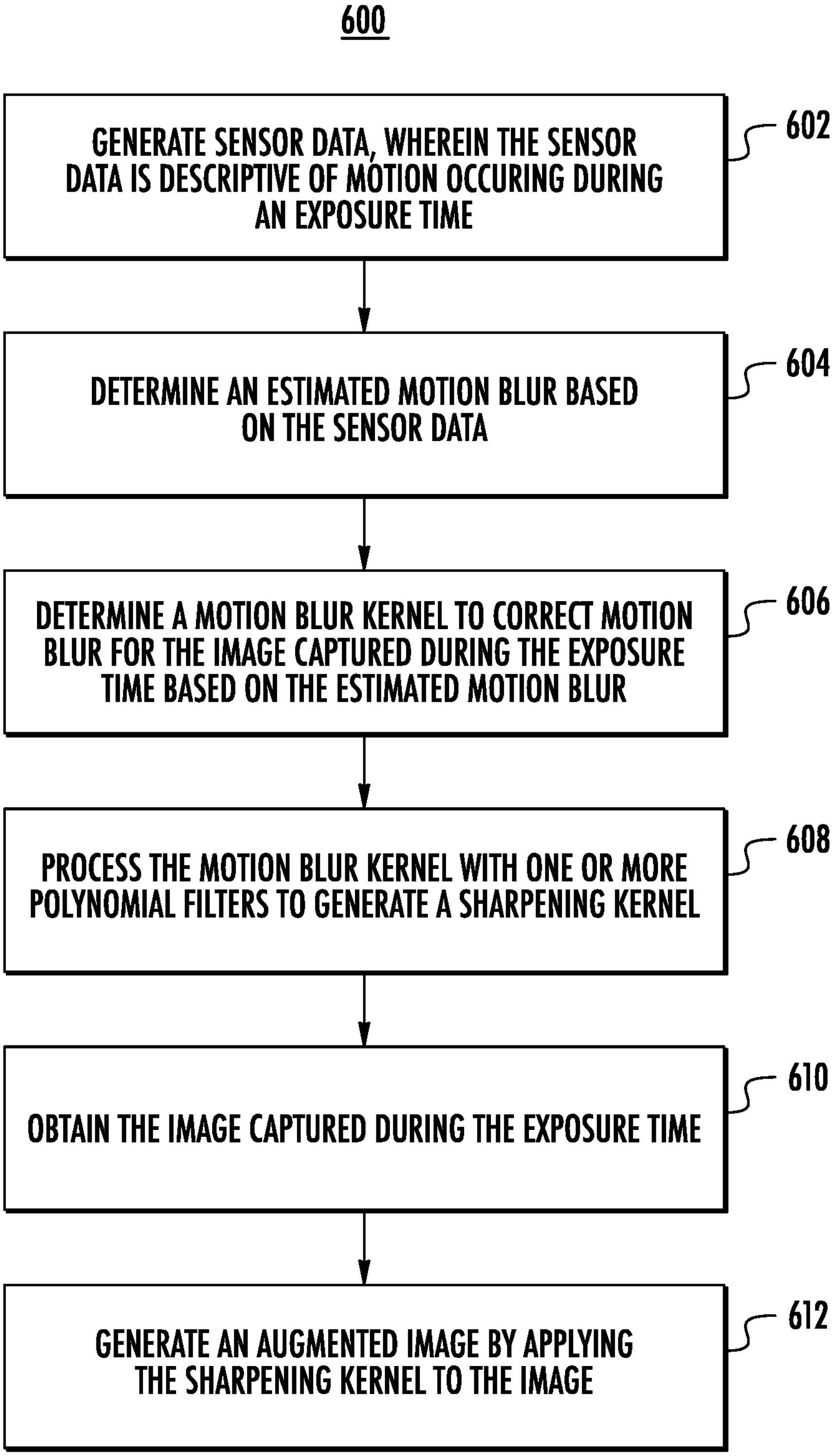

FIG. 6

JOINT VIDEO STABILIZATION AND MOTION DEBLURRING

PRIORITY CLAIM

The based upon and claims the right of priority under 35 U.S.C. § 371 to International Application No. PCT/US2021/042751 filed on Jul. 22, 2021, which is incorporated by reference herein.

FIELD

The present disclosure relates generally to deblurring and stabilizing images based on sensor data. More particularly, the present disclosure relates to obtaining sensor data, determining an estimated motion blur based on the sensor data, and correcting image data based on the estimated motion blur.

BACKGROUND

Video shakiness and sharpness are two important factors that impact video image quality. Indications of a high-quality video can include a stable image with good sharpness. However, movement during image or video capture can cause shakiness and reduce sharpness of the image or video. Equipment for keeping an image capture device stable can be large and expensive. For a user wishing to capture a spontaneous image, attaching the equipment can cause the user to miss the moment even if they are carrying the equipment.

Moreover, video stabilization using software and hardware can be used to remove the unwanted handshakes. However, motion blur, which is unavoidably captured in videos especially in low-light or large motion situations, becomes more visible and disturbing when videos are stabilized. Therefore, it can be desired to also remove such motion blur for a better video quality.

On the other hand, motion deblurring can be time consuming and does not suit video processing which requires real-time processing (e.g., less than 16 ms/frame for 60 fps recording). The large computational cost of current techniques can also be problematic for mobile computing devices with limited computing power.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for improved deblurring of an image. The method can include generating, by a computing system comprising one or more processors and one or more sensors, sensor data. In some implementations, the sensor data can be descriptive of motion occurring during an exposure time of the image. The method can include determining, by the computing system, an estimated motion blur for the image based on the sensor data. The method can include determining, by the computing system, masking strength for motion blur masking based on the estimated motion blur. The method can include determining, by the computing system, a motion blur kernel to correct motion blur for the image captured during the exposure time based on the estimated motion blur. In some implementations, the method can include generating, by the computing system, an augmented image by applying the motion blur kernel and the motion blur masking to the image.

In some implementations, generating the augmented image by applying the motion blur kernel to the image can include processing, by the computing system, the motion blur kernel with one or more polynomial filters to generate a sharpening kernel and applying the sharpening kernel to the image. The one or more sensors can include one or more gyro sensors, and the sensor data can include angular velocity data. The one or more sensors can include one or more optical image stabilization sensors. The sensor data can include optical image stabilization data, and determining an estimated motion blur can include generating a two-dimensional pixel offset based at least in part on the optical image stabilization data. In some implementations, generating the augmented image can include: determining, by the computing system, a motion blur offset based at least in part on the estimated motion blur and generating, by the computing system, the augmented image based at least in part on the motion blur offset. The method can include providing, by the computing system, the augmented image to a user. The method can include generating, by the computing system, an augmented video based at least in part on the image and the sharpening kernel. The augmented video can include the augmented image. The image can include a frame of a video. The method can include processing, by the computing system, the motion blur kernel to generate a non-blind polynomial deblur kernel. In some implementations, the sharpening kernel can be generated based on the non-blind polynomial deblur kernel. The motion blur kernel can include a maximum kernel size of thirty.

Another example aspect of the present disclosure is directed to a computing system. The system can include a plurality of sensors including one or more motion sensors and one or more image sensors. The computing system can include one or more processors and one or more non-transitory computer-readable media that collectively store instructions that, when executed by the one or more processors, cause the computing system to perform operations. The operations can include receiving a user input to capture an image with the one or more image sensors and generating image data during an exposure time in response to the user input. The operations can include generating sensor data with the one or more motion sensors. The operations can include processing the sensor data with one or more machine-learned models to generate a projection matrix and a virtual camera trajectory and determining an estimated motion blur based on the projection matrix and the virtual camera trajectory. In some implementations, the operations can include generating a motion blur kernel based at least in part on the estimated motion blur. The operations can include adjusting motion blur masking strength based at least in part on the projection matrix and generating augmented image data based on the motion blur masking strength and by applying the motion blur kernel to the image data.

In some implementations, the sensor data can include motion data and stabilization data, and generating the sensor data can include generating motion data with a gyro event handler and generating stabilization data with an optical image stabilization shift handler. The motion data can be descriptive of motion during the exposure time with the one or more motion sensors, and the gyro event handler can continuously fetch the sensor data from the one or more motion sensors and can estimate a latest camera pose. The optical image stabilization shift handler can continuously fetch optical image stabilization data and can convert the optical image stabilization data into a two-dimensional pixel offset. In some implementations, the operations can include processing the motion blur kernel with one or more polynomial filters to generate a sharpening kernel, and generating the augmented image data can include applying the sharpening kernel to the image data. The one or more polynomial filters can be calculated by repeated convolution of a linear kernel.

Another example aspect of the present disclosure is directed to one or more non-transitory computer-readable media that collectively store instructions that, when executed by one or more processors, cause a computing system to perform operations. The operations can include obtaining image data and motion data. In some implementations, the image data can include an image captured during an exposure time, and the motion data can be descriptive of a camera motion during the exposure time. The operations can include processing the image data and the motion data with an image correction model to generate augmented image data. In some implementations, the augmented image data can include an augmented image. The image correction model can be trained to: generate an estimated motion blur masking based on a stabilized virtual camera pose: generate an estimated frame deblur based on a motion blur kernel to generate a sharpening kernel using one or more polynomial filters: and correct an image based at least in part on the estimated motion blur masking and the sharpening kernel. The operations can include providing the augmented images to a user.

In some implementations, the image data can include a plurality of images, and the augmented image data can include a plurality of augmented images. The motion data can be generated with one or more motion sensors, and the one or more motion sensors can include a gyro sensor and an optical image stabilization sensor. In some implementations, the image correction model can be trained to generate projection matrices based at least in part on the motion data. The projection matrices can be a two-dimensional projection matrices, and determining an estimated motion blur can include mapping the image data to the projection matrices to determine the estimated motion blur. In some implementations, the estimated frame deblur can be generated based at least in part on the estimated motion blur. The image correction model can be trained to process the motion blur kernel with the one or more polynomial filters to generate the sharpening kernel, and generating the augmented image can include applying the sharpening kernel to the image. The sharpening kernel can be generated to enhance a temporal sharpness of the video data. The motion blur kernel can include an upper bound that limits an allowable computational time allowed. In some implementations, the image correction model can be trained to process the motion blur kernel with the one or more polynomial filters to generate the sharpening kernel, and generating the augmented image can include applying the sharpening kernel to the image. The one or more polynomial filters can include a polynomial filter family of a third degree. The image correction model can be trained to reduce motion blur masking strength based on the estimated motion blur. The operations can include generating a one-dimensional kernel based on the estimated motion blur, and the augmented image data can be generated based at least in part on the one-dimensional kernel.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which:

FIG. 6 depicts a flow chart diagram of an example method to perform image augmentation according to example embodiments of the present disclosure.

Figure 1A:
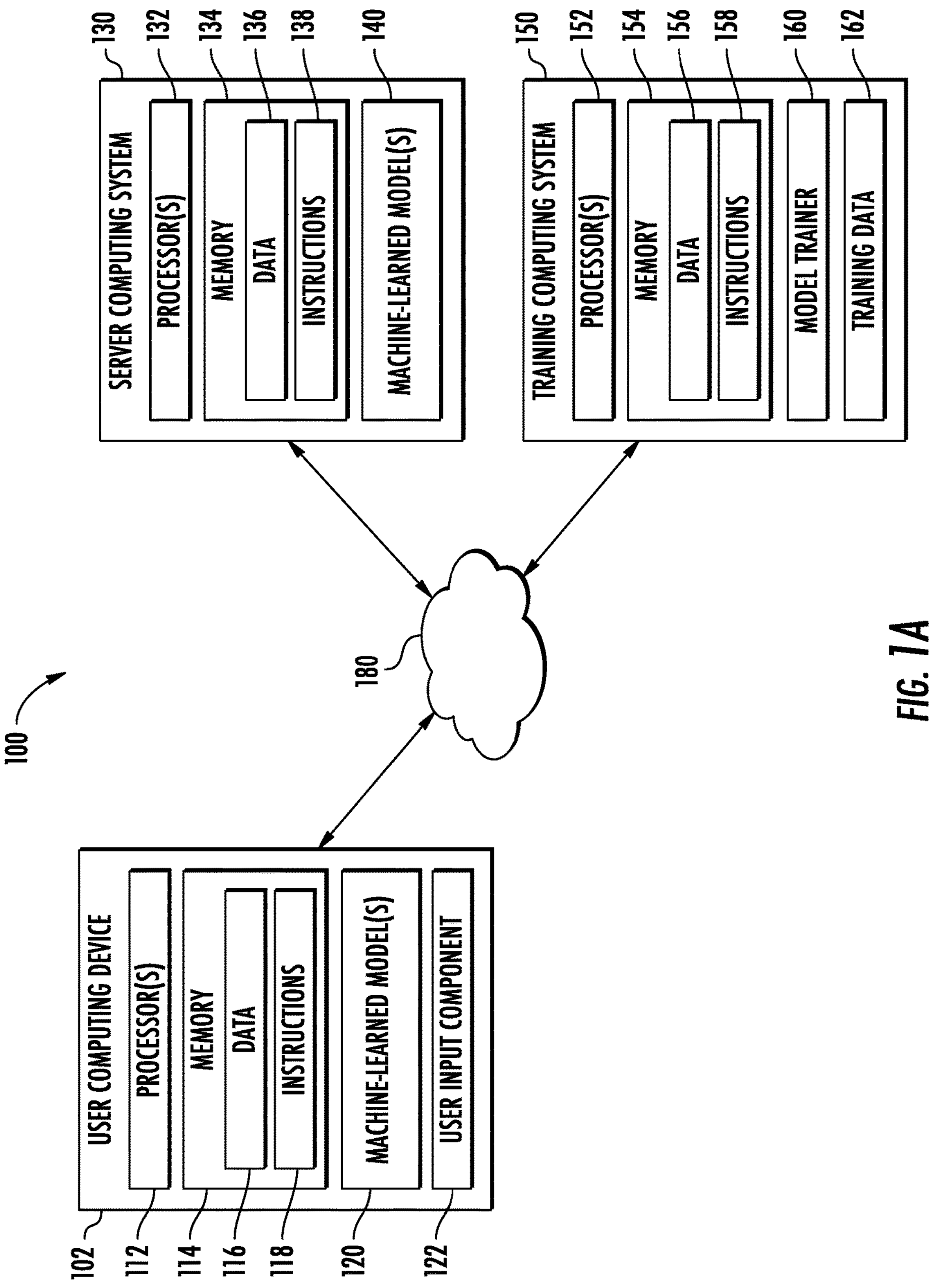
FIG. 1A depicts a block diagram of an example computing system that performs image data augmentation according to example embodiments of the present disclosure.

Reference numerals that are repeated across plural figures are intended to identify the same features in various implementations.

DETAILED DESCRIPTION

Overview

Generally, the present disclosure is directed to augmenting image data to stabilize and deblur one or more images based at least in part on sensor data. Analyzing image data to determine corrections can be computationally expensive. Systems and methods for real-time image correction can be more accessible to lower computational power devices when sensor data is utilized. For example, the systems and methods disclosed herein can obtain sensor data in real-time, determine an estimated motion blur based on the sensor data, and determine an image correction based on the estimated motion blur. Determination of the image correction can involve determining a motion blur kernel based on the estimated motion blur and adjusting motion blur masking strength based on the estimated motion blur. The motion blur kernel may be processed with one or more polynomial filters to generate a sharpening kernel. The image data can be processed with the motion blur kernel and the motion blur masking to generate the augmented image data. Alternatively and/or additionally, the image data can be processed with a sharpening kernel to generate the augmented image data, which can include one or more corrected images. The one or more corrected images can be augmented to stabilize and deblur the images. Alternatively and/or additionally, in some implementations, motion can be added into the image data to mitigate judder artifacts.

The systems and methods discussed herein can include a computing system with a plurality of sensors and/or a computer-implemented method. The plurality of sensors can include one or more image sensors for capturing one or more images and/or one or more videos. Additionally, the plurality of sensors can include one or more motion sensors. The one or more motion sensors can include a gyro sensor for measuring angular velocity and an optical image stabilization sensor for generating stabilization data.

The systems and methods can obtain sensor data from the one or more motion sensors and can obtain image data from the one or more image sensors. The sensor data and the image data can be obtained during an exposure time. The sensor data can be processed to determine an estimated motion blur (unless otherwise mentioned, motion blur as used herein is referring to blur due to camera motion, rather than blur caused by movement of objects in the scene being captured). The estimated motion blur can be used to determine masking strength for motion blur masking and can be used to determine a motion blur kernel, which can be processed with one or more polynomial filters to generate a sharpening kernel. Augmented image data can then be generated by applying the motion blur masking and the motion blur kernel. Alternatively and/or additionally, the image data and the sharpening kernel can be processed to generate the augmented image data.

In some implementations, the systems and methods can include generating the sensor data and image data in response to a user input to capture one or more images. In some implementations the sensor data can include motion data. The motion data can include angular velocity data generated with one or more gyro sensors and can include optical image stabilization data generated with one or more optical image stabilization sensors.

The sensor data can be processed with one or more machine-learned models to generate a projection matrix and a virtual camera trajectory. The projection matrix and the virtual camera trajectory can be used to determine an estimated motion blur. The estimated motion blur can then be used to generate a motion blur kernel. Moreover, the estimated motion blur can be used to determine motion blur masking strength. Augmented image data can then be generated based on the masking strength for the motion blur masking and based on the motion blur kernel being applied to the image data. In some implementations, the motion blur kernel can be processed with one or more polynomial filters to generate the sharpening kernel, which can then be used to augment image data.

The systems and methods for video stabilization and deblurring disclosed herein can leverage one or more machine-learned models to stabilize and deblur images and videos in real-time. The systems and methods can continually generate image data and motion data. The image data and motion data can be processed by one or more correction models to generate augmented image data that includes one or more corrected images. The correction models can be trained to process the motion data and image data to generate stabilized, deblurred images. For example, the motion data can be processed to estimate a motion blur. The trained correction model can then use non-blind polynomial deblurring (e.g., deblurring with a known or generated polynomial kernel) and a strong stabilization with little to no motion blur masking. The estimated motion blur can be used to determine a motion blur kernel, which can be used to determine a polynomial deblur kernel. The polynomial deblur kernel can then be used to remove the motion blur in the image data.

In some implementations, the systems and methods can utilize a gyro event handler, an OIS lens shift handler, a motion model constructor, and a stabilization engine. The gyro event handler can continuously fetch a gyro signal and estimate the latest camera pose, R(t) at high frequency. The OIS lens shift handler can continuously fetch an OIS readout and convert the OIS readout into a 2D pixel offset. The motion model constructor can take an input frame, and can associate metadata (e.g., exposure time at each scanline and lens position) and the camera pose as well as the OIS lens offset, to construct the projection matrix that maps the real world scene to the image. The stabilization engine can produce a stable and smooth virtual camera trajectory.

More specifically, the systems and methods disclosed herein can include both deblurring techniques and video stabilization techniques. The systems and methods disclosed herein can include receiving a user input. The user input can be an input to capture one or more images with the one or more image sensors. In response to the user input, image data can be generated using one or more image sensors during an exposure time. In some implementations, sensor data can be generated or obtained using one or more motion sensors. The motion sensors can include a gyro sensor for generating angular velocity data and an optical image stabilization sensor for generating stabilization data. The sensor data can be descriptive of motion occurring during the exposure time.

In some implementations, the systems and methods can include generating motion data with a gyro event handler. The gyro event handler can continuously fetch or obtain the sensor data from the one or more motion sensors and can estimate a latest camera pose. Additionally and/or alternatively, the systems and methods can include generating stabilization data with an optical image stabilization shift handler. The optical image stabilization shift handler can continuously fetch optical image stabilization data and can convert the optical image stabilization data into a two-dimensional pixel offset.

In some implementations, the systems and methods can include generating estimated motion blur masking based on a stabilized virtual camera pose.

The sensor data can be used to determine an estimated motion blur. Determining the estimated motion blur can include generating the two-dimensional pixel offset based at least in part on the optical image stabilization data.

Alternatively and/or additionally, the sensor data can be processed with one or more machine-learned models to generate a projection matrix and a virtual camera trajectory. In some implementations, the projection matrices can include a two-dimensional projection matrices.

In some implementations, the estimated motion blur can be determined based on the projection matrix and the virtual camera trajectory.

The estimated motion blur can be used to determine or generate a motion blur kernel to correct motion blur for one or more images captured during the exposure time. In some implementations, the motion blur kernel can include a maximum kernel size of thirty. Alternatively and/or additionally, the motion blur kernel can include an upper bound that limits the allowable computational time allowed. In some implementations, the motion blur kernel can include or be a one-dimensional kernel.

The motion blur kernel can be processed with one or more polynomial filters to generate a sharpening kernel. In some implementations, the motion blur kernel can be processed to generate a non-blind polynomial deblur kernel. The non-blind polynomial deblur kernel can then be generated based on the sharpening kernel. Alternatively and/or additionally, the sharpening kernel can include a non-blind polynomial deblur kernel. The one or more polynomial filters may be calculated by repeated convolution of a linear kernel. In some implementations, the sharpening kernel can be generated to enhance the temporal sharpness of the video data. Moreover, the one or more polynomial filters can include a polynomial filter family of a third degree.

The image data and the motion blur kernel can then be processed to generate augmented image data. Alternatively and/or additionally, the image data and the sharpening kernel can be processed to generate augmented image data. The augmented image data can include one or more augmented images. Alternatively and/or additionally, the augmented image data can include an augmented video. The augmented video can include one or more augmented images. The one or more augmented images can be frames of the augmented video. In some implementations, the augmented image data can be augmented based at least in part on a motion blur offset determined based on the estimated motion blur. In some implementations, the augmented image data can include one or more corrected images that have been stabilized and deblurred. Moreover, the augmented video data may include stabilized video data. In some instances, motion blur becomes more noticeable after video stabilization: therefore, motion blur masking can be used during stabilization to introduce a small amount of real camera motion to the processed video. Although the resulting video may be less stable, the disparity in the image sharpness is less noticeable as it can be perceived by the eye as a natural effect due to camera motion. The sharpness kernel described herein can enhance the sharpness of the image data, while at the same time deblurring the image data. Therefore, the systems and methods can mitigate or eliminate the sharpness disparity that can occur with previous stabilization techniques, allowing for the use of weaker motion blur masking, or even no blur masking, in the stabilization process. A sharper and more stable video may therefore be provided.

In some implementations, the augmented image data may be generated based on a down-sampled version of the one or more images.

The systems and methods can include providing the augmented image data to a user. The augmented image data may be sent to a user computing device and/or may be displayed on a visual display of a user computing device.

The systems and methods for image data augmentation can include motion blur masking. For example, an electronic image stabilization system can be used that can mask the image to provide a more stabilized appearance to videos and image capture. In some implementations, the systems and methods can reduce motion blur masking strength based on the estimated motion blur.

In some implementations, the systems and methods disclosed herein can be used for stabilizing and deblurring images and videos in real-time. Moreover, in some implementations, the systems and methods can provide real-time augmented image data feedback for a temporary preview of what image or video capture would look like if the user were to put in an input to begin image or video capture. The systems and methods disclosed herein can be provided through a mobile application, a computer application, a web application, a web service, and/or may be a default feature installed on a computing device. The systems and methods can involve configuring the computational processing to be able to complete the image data augmentation on computing devices with limited computational power.

The systems and methods can include blind deconvolution, which can involve a first step to estimate a blur kernel (PSF, point spread function) from the input frame, and a second step which can be non-blind deconvolution with the given blur kernel. Additionally and/or alternatively, the systems and methods can include end-to-end stabilization and a deblurring framework that uses sensor data only and no image-based PSF estimation. By using only sensor data, the approach described herein may facilitate provision of a more accurate and more computationally efficient approach to video stabilization and deblurring.

The systems and methods can be implemented as part of a video blur optimization framework. The video blur optimization framework can include a blur refinement node. The blur refinement node can include a gyro sensor and an optical image stabilization sensor for generating input for a camera motion analysis model to process with dense motion vectors. The dense motion vectors can be based on frame data. The camera motion analysis output and the frame data can then be processed with a blur status model to generate a blur manipulation kernel. The blur manipulation kernel and the frame data can be processed with an image convolution model to generate blur refinement data. In some implementations, the frame data can include image data, and the blur refinement data can include augmented image data. The output of the camera motion analysis may be estimated motion blur. Moreover, the blur manipulation kernel may be a sharpening kernel.

Additionally and/or alternatively, the video blur optimization framework can include a sensor node for obtaining and generating image data and sensor data. The framework can include an electronic image stabilization node. The electronic image stabilization node can include determining and providing image segmentation to provide stabilized data. In some implementations, the masking strength for the node can be reduced or removed based on the implementation of the kernel generation and image correction.

The masked image data can then be processed by a warping node, or warping model, to fix potential warping issues. The output of the warping node can feed into the blur refinement node as frame data. The blur refinement data can then be processed by a scalar node, or scalar model, to generate output image data.

In some implementations, the systems and methods can include adding motion blur to the image data to reduce, eliminate, or mitigate judder artifacts. For example, the systems and methods can be used to stabilize and deblur the image data, and then motion blur can be added to mitigate juddering and ghosting. The added motion may be one dimensional and may be of limited acceleration.

The systems and methods may be trained or configured to determine and provide optimal blur for better video quality. For example, blur may be reduced to deblur and stabilize the image data, but some blur may be maintained or added to reduce judder. Adding synthetic motion blur based on the real motion direction can help reduce/eliminate the Judder artifact.

In some implementations, the systems and methods can include processing times of 3.5~5 ms/frame on a 1080 p frame with a 1D kernel size 30. Moreover, in some implementations, the systems and methods can include a LLV single-gaussian pass with a 5×5 kernel, which can cost 0.5~1 ms/frame. The systems and methods can include 3 times of convolution (1.5~3) and integration (2). The maximum kernel size can be no larger than 30, in some implementations. 4K data may be downsampled before processing. These constraints on the kernel size can facilitate an improved deblurring approach which is still computationally efficient enough to be implemented in real time video processing, for example on a mobile device.

In some implementations, the systems and methods can include polysharp and linear PSF. The systems and methods can include judder score evaluation and desired motion blur estimation. The systems and methods can include a combination of deblur kernels and blur kernels.

The systems and methods may utilize the judder metric denoted below:

$$J=M(\text{mean of gradient})N(\text{speed}_{panning})Q(\text{fps}).$$

Where M, N can be logistic regressions. The mean of gradient can be calculated as a 4×4 window average of the frame gradient perpendicular to the main panning axis. Q can be a linear regression based on two anchor points (e.g., Q(30)=1 and Q(60)=0). The image acutance (e.g., contrast/blur) can be measured in M, and it can be weighted by the panning speed and fps. The mean of the Judder score can also be used for a global metric on how much judder is observed, and how much blur to add to hide the judder. The judder metric can be validated using the metrics on changing speed, illumination, exposure (thus sharpness), and fps.

In some implementations, the estimated motion blur and/or the projection matrix can be used to determine masking strength for motion blur masking. The implementation of motion blur kernels can allow for the reduction or removal of motion blur masking. Motion blur masking can involve segmentation masking of the image data for the appearance of motion stabilization using electronic image stabilization techniques. For example, motion blur masking can involve adjusting frame motion to follow the specific direction of the motion blur. Alternatively and/or additionally, motion blur masking can include limiting image stabilization and/or adding motion to the image.

In some implementations, one or more polynomial filters can be used to generate a sharpening kernel. The one or more polynomial filters may be generated based on an estimated motion blur and may be formulated using mathematical models for polynomial deblurring and for halo removal. Polynomial filters may use the estimated blur as a base and approximate the inverse without neglecting that image noise can be amplified. Additionally and/or alternatively, in some implementations, in order to prevent or mitigate oversharpening, a mathematical characterization of halos can be formulated and blended with a blending mechanism.

The polynomial filter may be used to determine an inverse blur using a motion blur kernel as a base. For example, the polynomial approximate inverse for an order three can be denoted as $$K_3^{inv}=4I-6K+4K^2-K^3.$$

The use of more general polynomials can be denoted as $$p(K)=\sum_{i=0}^{d}a_iK^i.$$

In some implementations, the order d and the coefficients ($a_0$, . . . , $a_d$) can be designed to amplify or attenuate differently depending on how the blur is affecting a particular component.

In some implementations, the polynomial filters can include symmetric filters with non-negative Fourier coefficients. The polynomial filters can be configured invert blur while avoiding noise amplification. A polynomial filter with an order family of three can provide for lower computational cost while controlling mid-frequency boosting and noise amplification. In some implementations, multiple applications of a singular filter or the use of several filters may provide more refined results.

In some implementations, an image may be pre-processed with a correction filter if the motion blur kernel includes a negative or complex Fourier coefficient. The correction filter can be used to generate a motion blur kernel with simple, non-negative Fourier coefficients. In some implementations, the correction filter can be complemented with or replaced with a pure phase filter.

The systems and methods of the present disclosure provide a number of technical effects and benefits. As one example, the system and methods can provide a stabilized and deblurred image based at least in part on sensor data. More specifically, the systems and methods can process sensor data to determine an estimated motion blur which can be used to generate a motion blur kernel that can be used to generate a sharpening kernel to stabilize and deblur the image data. The systems and methods may utilize one or more polynomial filters to generate the sharpness kernel.

Another technical benefit of the systems and methods of the present disclosure is the ability to mitigate or eliminate judder artifacts using the systems and methods disclosed herein. In some implementations, motion may be added to the image data to further mitigate judder artifacts.

Another example technical effect and benefit relates to improved computational efficiency and improvements in the functioning of a computing system. For example, the systems and methods disclosed herein can leverage the use of sensor data for estimating motion blur instead of using image data analysis. The use of sensor data for virtual estimation and mapping the virtual estimation to the real world can lessen the computational cost for stabilizing and deblurring the image data. In this way, a more computationally efficient approach for real time video stabilization and deblurring may be provided which can be integrated into mobile computing device video capture systems. Moreover, in some implementations, motion masking may be reduced or removed altogether in place of the systems and methods disclosed herein.

With reference now to the Figures, example embodiments of the present disclosure will be discussed in further detail.

Example Devices and Systems

FIG. 1A depicts a block diagram of an example computing system 100 that performs image data augmentation according to example embodiments of the present disclosure. The system 100 includes a user computing device 102, a server computing system 130, and a training computing system 150) that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more image correction models 120. For example, the image correction models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example image correction models 120 are discussed with reference to FIGS. 2 & 3.

In some implementations, the one or more image correction models 120 can be received from the server computing system 130 over network 180, stored in the user computing device memory 114, and then used or otherwise implemented by the one or more processors 112. In some implementations, the user computing device 102 can implement multiple parallel instances of a single image correction model 120 (e.g., to perform parallel image data augmentation across multiple instances of image capture).

More particularly, the systems and methods can obtain image data and sensor data from a plurality of sensors, which can include one or more image sensors and one or more motion sensors. The plurality of sensors can be integrated within or otherwise associated with the user computing device 102, or may be integrated within or associated with another image capture device (such as a camera) of the computing system 100. The sensor data can be processed to determine an estimated motion blur of the image capture device. The estimated motion blur can be used to generate a motion blur kernel, which may be a one-dimensional kernel. The motion blur kernel can then be processed with one or more polynomial filters to generate a sharpening kernel. The sharpening kernel can then be used to augment the image data to generate augmented image data.

Additionally or alternatively, one or more image correction models 140 can be included in or otherwise stored and implemented by the server computing system 130 that communicates with the user computing device 102 according to a client-server relationship. For example, the image correction models 140 can be implemented by the server computing system 140 as a portion of a web service (e.g., an image stabilization and deblur service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned image correction models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 2 & 3.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be backpropagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the image correction models 120 and/or 140 based on a set of training data 162. The training data 162 can include, for example, sets of training sensor data and training image data. The training image data can include a set of unstabilized, blurred images and a set of stabilized, deblurred images. The models can be trained to determine motion blur, and in some implementations, the sensor data can have a respective image data for comparison of the estimated motion blur between sensor data determined blur and image data analysis determined blur. Training may also include using one or more loss functions to evaluate and adjust parameters of the model for sharpness, deblur, stabilization, and judder artifact removal. The training can include having manually-corrected images and augmented images compared to determine adjustments to be made to the parameters of the one or more machine-learned models.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160) includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be statistical data. The machine-learned model(s) can process the statistical data to generate an output. As an example, the machine-learned model(s) can process the statistical data to generate a recognition output. As another example, the machine-learned model(s) can process the statistical data to generate a prediction output. As another example, the machine-learned model(s) can process the statistical data to generate a classification output. As another example, the machine-learned model(s) can process the statistical data to generate a segmentation output. As another example, the machine-learned model(s) can process the statistical data to generate a segmentation output. As another example, the machine-learned model(s) can process the statistical data to generate a visualization output. As another example, the machine-learned model(s) can process the statistical data to generate a diagnostic output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
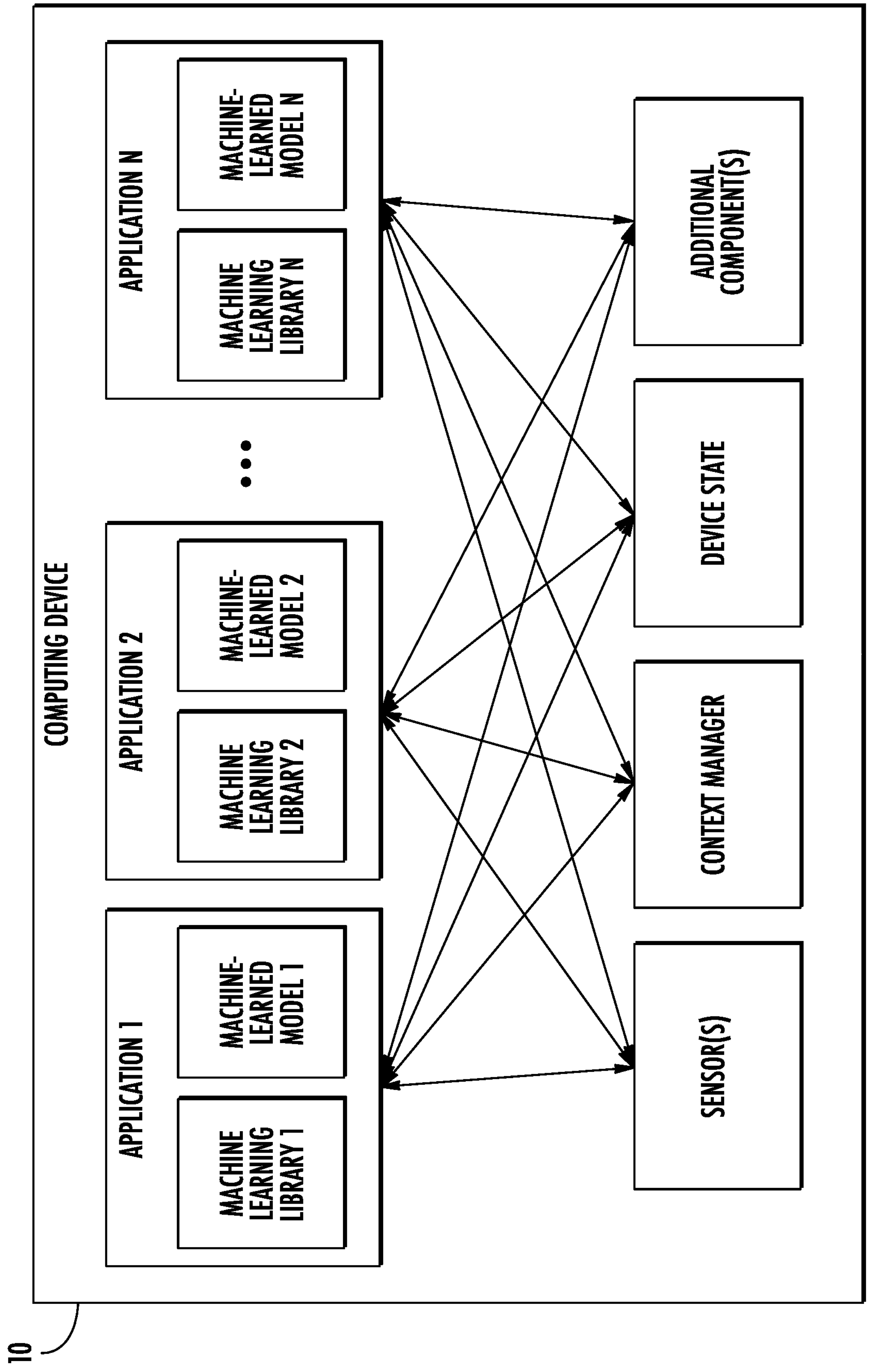
FIG. 1B depicts a block diagram of an example computing device that performs image data augmentation according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
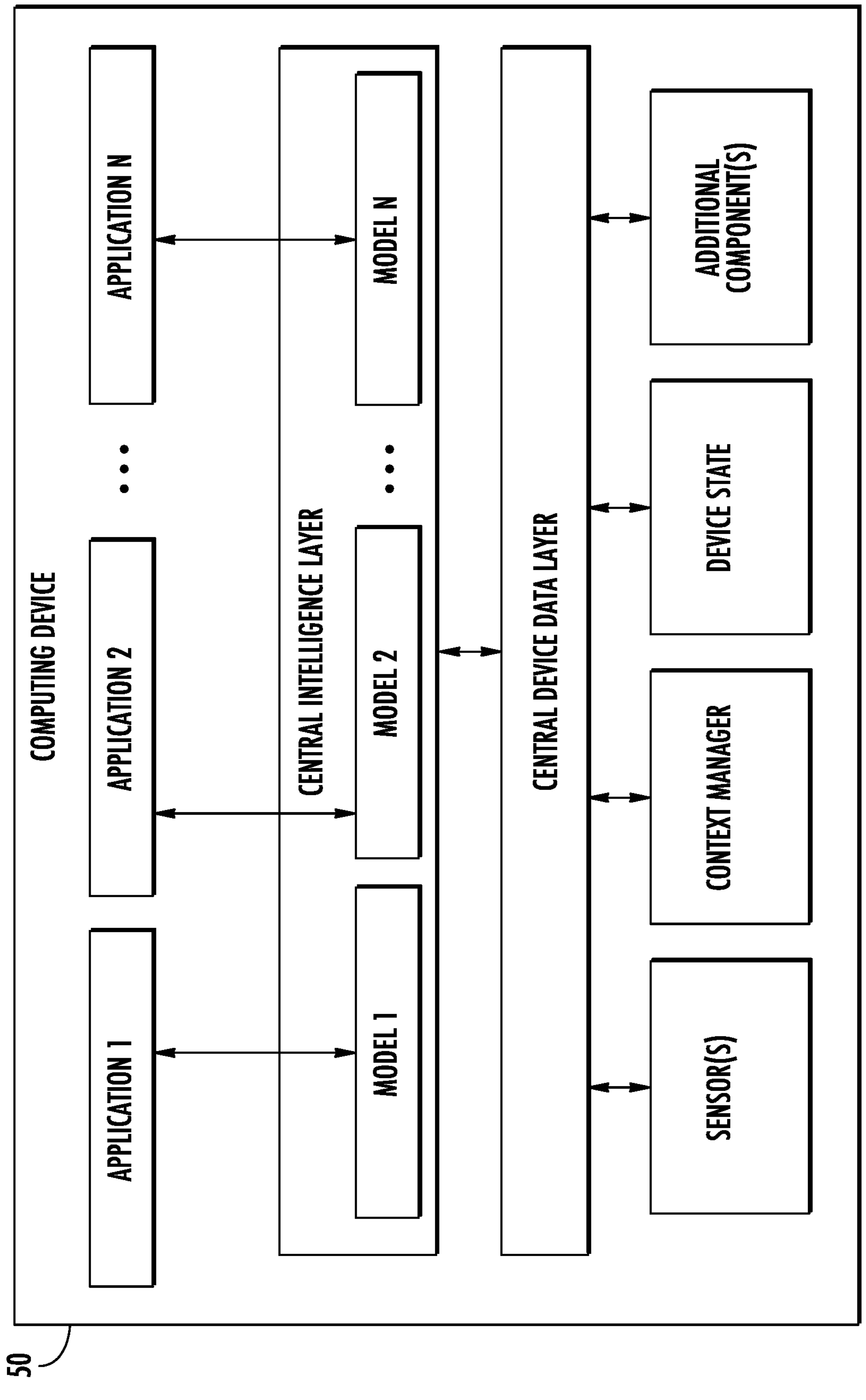
FIG. 1C depicts a block diagram of an example computing device that performs image data augmentation according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

In some implementations, the systems and methods can combine video stabilization techniques and deblurring techniques. In some implementations, the systems and methods can estimate the motion blur using sensor data only, which is accurate and efficient, and then, can perform non-blind polynomial deblurring (e.g., perform deconvolution, or deblurring, using a known polynomial deblur kernel) and a stronger stabilization with less or no motion blur masking. At the first step, the system and method can use the gyroscope and/or OIS data (i.e., sensor data) as input as well as the frame metadata (e.g., frame timestamp, exposure). The systems and methods can estimate the motion blur (e.g., a 2D vector) from the real camera motion between the start and end of the exposure (i.e., estimate the motion blur of the image capture device or camera based on the generated/obtained sensor data). At the second step, the motion blur kernel can be used to calculate the polynomial deblur kernel, which can then be used to remove the motion blur. Meanwhile, because of the enhanced frame sharpness, the motion blur masking strength used in the video stabilization can be reduced so the system can get a better stabilized video as well as enhanced temporal sharpness consistency simultaneously.

In some implementations, the systems and methods can include a sensor-based stabilization solution and joint stabilization with frame deblur. The sensor-based stabilization solution can include a gyro event handler, an OIS lens shift handler, a motion model constructor, and a stabilization engine.

The gyro event handler can continuously fetch the gyro signal and can estimate the latest camera pose, R(t) at high frequency (e.g., 200 Hz). In some implementations, the OIS lens shift handler can continuously fetch the OIS readout and can convert the OIS readout into a 2D pixel offset in pixels $O_{len}(t)=(O_{len}(x,t), O_{len}(y,t))$.

Given an input frame, the motion model constructor can use the associated metadata (e.g., exposure time at each scanline and lens position), and the camera pose as well as the OIS lens offset can be used to construct the projection matrix that maps the real world scene to the image.

In some implementations, the stabilization engine can produce a stable and smooth virtual camera trajectory.

Given a real camera pose V(T) and a virtual camera pose V'(T), the systems and methods can get two projection matrices as P(T) and P'(T). The systems and methods may then map from the 2D real camera domain $x_r$ to the 2D virtual camera domain $x_v$. The mapping can be denoted as $x_v=P_{real}$ to virtual $(T)*x_r$, where the real to virtual projection matrix can be $P_{real}$ to virtual $(T)=P'(T)*P^{-1}(T)=K'(T)*R'(T)*R^{-1}(T)*K^{-1}(T)$.

The rotation R can be represented by a 3×3 matrix, a 1×4 Quaternion, and/or a 1×3 axis angle. The different representations can be equivalent. For example, the systems and methods can use the 3×3 matrix representation to calculate the projection matrix above.

In some implementations, the systems and methods can first estimate motion blur using sensor data and can then use the estimated motion blur for the joint stabilization and frame deblur.

Motion in a video can be caused by either camera motion or subject/object movements in the scene. For camera motion, sensor data can be used to estimate the motion blur. Specifically, given the current real frame timestamp T and the exposure time E, the systems and methods can obtain the camera projection matrices at T−E and T+E, say $P(T-E)=K(T-E)R(T-E)$ and $P(T+E)=K(T+E)R(T+E)$. Then, the camera motion during exposure can be approximated as $M=P*C-C$, where $P=P(T+E)*P^{-1}(T-E)$ can be the homography transform from camera at T−E to camera T+E, and C can be the image center.

For the purpose of motion blur masking, the stabilized virtual camera pose can be obtained as $$V'_{masking}(T) = SLERP\left(V'_{stab\_engine}(T),\ V(T),\ w\left(\|M\|^2\right)\right),$$

where $V'_{stab\_engine}(T)$ can be the stabilized virtual pose from any stabilization engine, V(T) can be the real camera pose, SLERP can be the spherical linear interpolation on rotation, and $w(\|M\|^2)$ can be the SLERP interpolation weight based on the magnitude of motion blur. In some implementations, w can be inversely proportional to the magnitude (i.e., The resulting pose can be close to the stabilized one if there is a slight or no motion blur, and can rotate toward the real camera pose when the magnitude is large).

In some implementations, for the purpose of frame deblur, the estimated motion blur kernel can be used to generate the sharpening kernel using the polynomial filters. Specifically, the polynomial filter family of degree d=3 can be used, where $$P_{\{3,a,b\}}(x)=(a/2-b+2)x^3+(3b-a-6)x^2+(5-3b+a/2)x+b,$$

where a can control how the mid-frequencies are amplified, b can control how noise is amplified at the frequencies that are completely attenuated by the blur, and x can be the motion blur kernel estimated from M (the camera motion during the exposure). For example, the estimated motion blur kernel can have an angle and a length representing the direction and size of the blur, in which angle and length can be based on the direction and size (e.g., magnitude) of the camera motion M during the image capture. The motion blur kernel can be generated by either: (1) rendering a linear kernel by accumulating 2D gaussians centered at the effective pixels and then calculating the polynomial filter by repeated convolution of the rendered kernel: or (2) directly computing the analytic formulation derived from the equation above. In some implementations, the time complexity of the deblur process can depend on the magnitude of the motion blur (e.g., the larger the motion blur, the longer time the process can take). The kernel can then be used to deblur the frame such that $I'=B*I$, where $B=p_{\{3,a,b\}}(x)$ and where * is the 2D convolution.

To combine the stabilization and deblur and make them efficient enough for real-time video processing, the systems and methods can add more controls on their bridge (e.g., the motion blur kernel M). In some implementations, an upper bound on the magnitude of M can be imposed before the deblur $$\text{e.g., } M' = \min\left(\text{Upperbound},\ \|M\|^2 * \frac{M}{\|M\|^2}\right).$$

In some implementations, the time cost of the deblur can be bounded, and the systems and methods can still enjoy the sharpness improvement on mild motion blur. Alternatively and/or additionally, because of the improved sharpness consistency, the stabilized videos can look natural with a weaker motion or no blur masking. Therefore, the systems and methods may scale down the SLERP weight to reduce the motion blur masking strength and make the resulting video more stable.

In some implementations, the systems and methods can support other extensions on blur manipulation. For example, the systems and methods may inject additional motion blur during camera panning to reduce the subjective judder artifact. In this case, the denoted equation can be changed to replace B with a motion blur kernel, or a joint kernel as $B'=H*p_{\{3,a,b\}}(x)$, where H can be the motion blur kennel used to reduce judder effect, and $p_{\{3,a,b\}}(x)$ can be the sharpening kernel that accounts for camera motions along all other directions except for the main panning direction.

Figure 2:
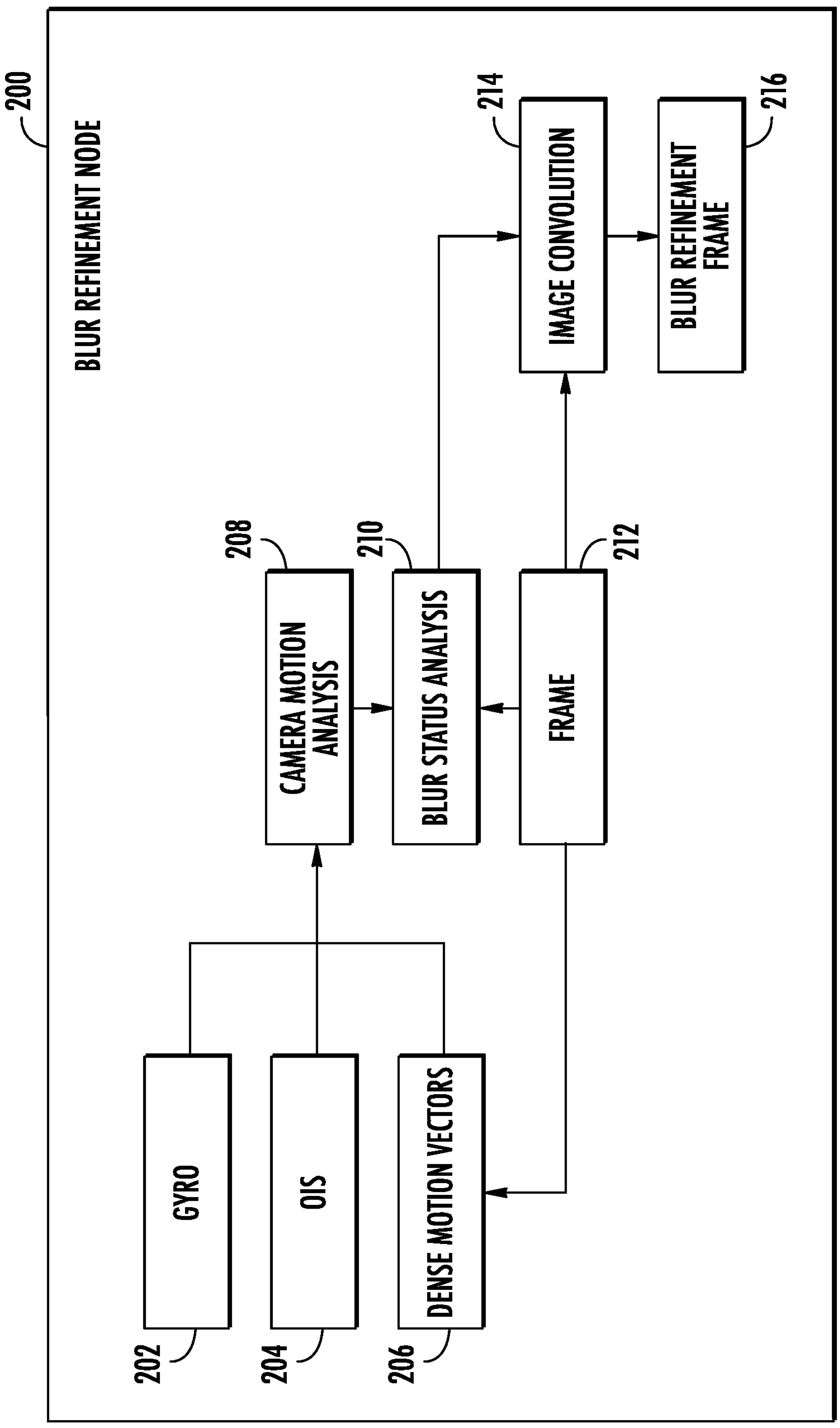
FIG. 2 depicts a block diagram of an example blur refinement model according to example embodiments of the present disclosure.

FIG. 2 depicts a block diagram of an example blur refinement model 200 according to example embodiments of the present disclosure. In some implementations, the blur refinement model 200 is trained to receive a set of input data 202 and 204 descriptive of movement of an image capture device and, as a result of receipt of the input data 202 and 204, provide output data 216 that includes augmented image data with one or more corrected images. Thus, in some implementations, the blur refinement model 200 can include a blur status model 210 that is operable to generate a motion blur kernel and an image convolution model 214 for augmenting the image data based on the generated kernel.

The blur refinement model 200 can include one or more sub-models including a camera motion model 208, a blur status model 210, and an image convolution model 214. The camera motion model 208 can process obtained input data 202 and 204 to generate an estimated motion blur. The input data can include angular velocity data generated with one or more gyro sensors 202 and stabilization data generated with one or more OIS sensors 204. Alternatively, zero OIS sensors may be used. The estimated motion blur can be determined by determining one or more projection matrices and one or more virtual camera trajectories. Moreover, in some implementations, a two-dimensional pixel offset can be determined based on the input data 202 and 204. Generating estimated motion blur can involve determining a virtual pixel offset and mapping the virtual pixel offset to a real world pixel offset.

In some implementations, the estimated motion blur may be determined based at least in part on dense motion vectors 206 derived based on obtained frame data 212. In some implementations, the frame data 212 can include image data generated with one or more image sensors during an exposure time. The frame data can include masked and dewarped image data.

The estimated motion blur and obtained frame data 212 can be processed with one or more blur status models 210 to generate one or more kernels for image correction. In some implementations, the blur status model 210 can generate a blur manipulation kernel. The blur manipulation kernel can be a sharpening kernel. The sharpening kernel can be generated by processing a motion blur kernel with a polynomial filter. The motion blur kernel may be generated based on the estimated motion blur.

Once the blur manipulation kernel is generated, the kernel and the frame data 212 can be processed with the image convolution model 214 to generate blur refinement data 216. In some implementations, the blur refinement model 200 can be a correction model or augmentation model that can be used to generate augmented image data, which can include one or more corrected images or corrected video.

Figure 3:
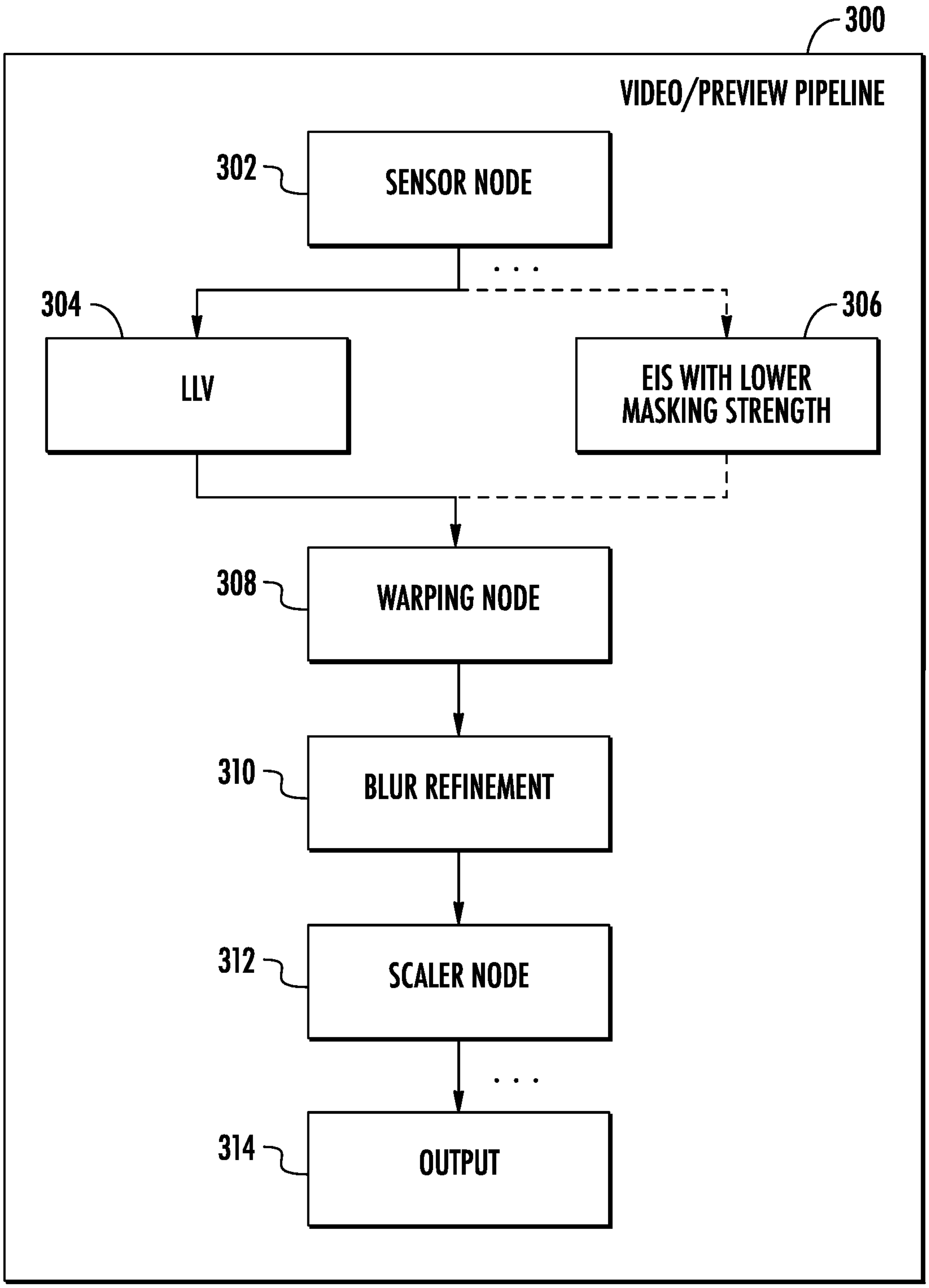
FIG. 3 depicts a block diagram of an example video/preview pipeline according to example embodiments of the present disclosure.

FIG. 3 depicts a block diagram of an example video/preview pipeline 300 according to example embodiments of the present disclosure. The video/preview pipeline 300 includes the blur refinement model 200 of FIG. 2.

The video/preview pipeline 300 can be used to generate real-time corrected image data based on obtained sensor data. The video/preview pipeline 300 can include a sensor node 302, a denoising node (e.g., an LLV node) 304, a stabilization node (e.g., EIS node) 306, a warping node 308, a blur refinement node or model 310, and a scalar node 312. In some implementations, the final output 314 can be augmented image data including one or more corrected images.

The pipeline 300 can begin by obtaining image data and sensor data with the sensor node 302. The sensor node 302 can obtain the image data from one or more image sensors and can obtain the sensor data from one or more motion sensors. The motion sensors may include gyro sensors that generate angular velocity data and optical image stabilization sensors that generate stabilization data.

The image data and the sensor data can be processed by one of or both of a denoising node 304 or a stabilization node 306. The denoising node 304 may involve processing the data with an LLV single-gaussian pass. The stabilization node 306, or EIS node, can involve using image masking for stabilizing the image data (e.g., image segmentation masking). In some implementations, the masking strength may be adjusted (e.g., lowered, or reduced) in response to the use of the deblur and stabilization techniques discussed herein. Moreover, in some implementations, the stabilization node 306 may be removed. In other words, video stabilization may not be performed. In instances where image masking is used for stabilizing the video, the blur masking strength may be determined at the EIS node 306 for use later in pipeline 300.

The masked image data can then be processed with a warping node 308 or warping model to correct potential warping issues with the image data due to lens issues, perspective, or focus issues. The warping output can then be processed with the blur refinement model 310, or correction model.

The blur refinement model 310 can process the image data and sensor data to generate blur refinement data image data and/or augmented image data. The blur refinement model 310 can process the sensor data to generate an estimated motion blur. The estimated motion blur can then be used to generate a one-dimensional motion blur kernel. The motion blur kernel can be processed with one or more polynomial filters to generate a sharpening kernel. The sharpening kernel can be processed with the image data to generate sharpened, deblurred, stabilized image data.

The blur refinement data can then be processed by a scalar node 312 to generate the final output 314, which can include augmented image data. The augmented image data can include one or more corrected images that have been deblurred, stabilized, and sharpened.

Figure 4:
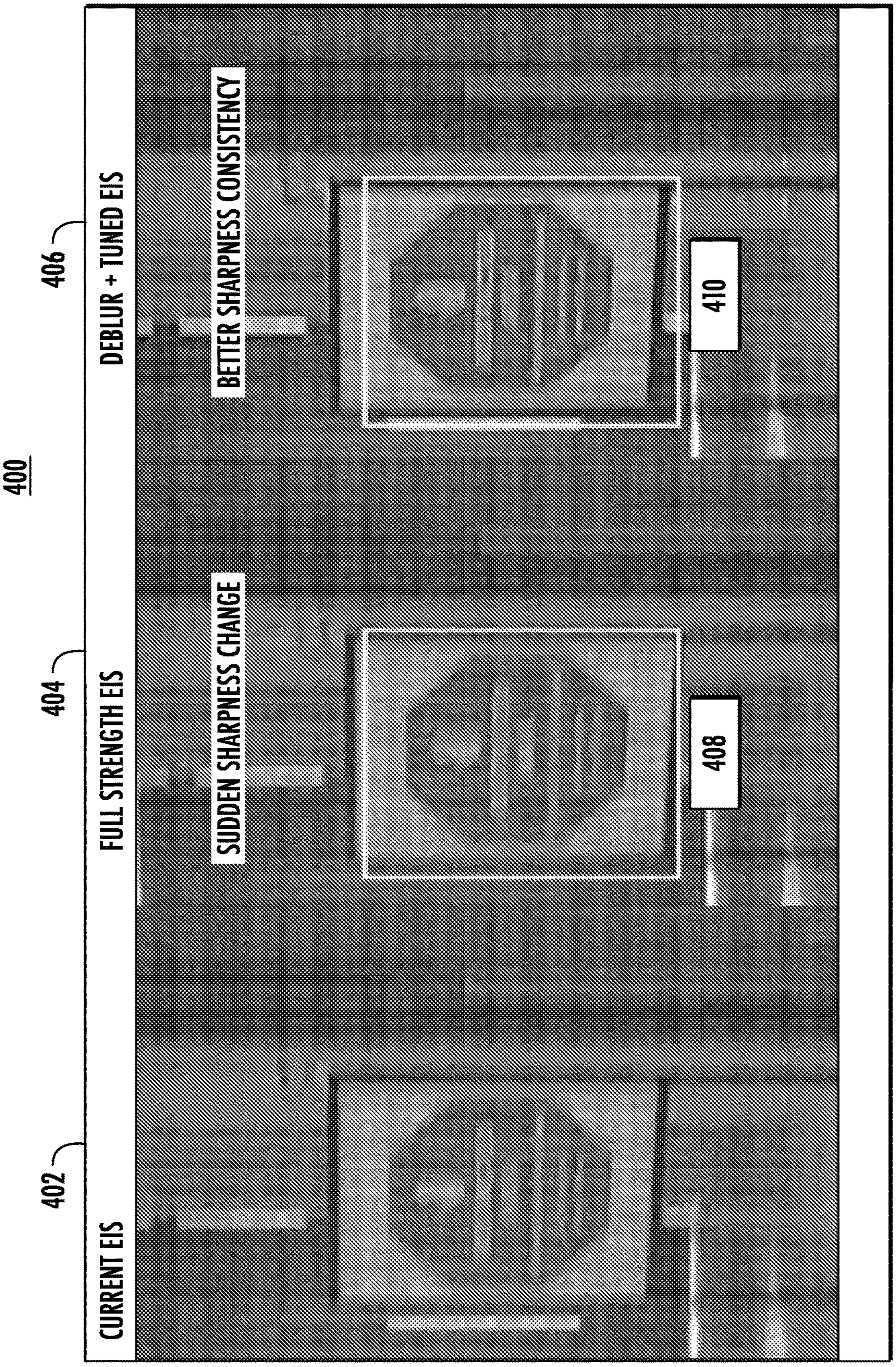
FIG. 4 depicts a block diagram of example augmented image results according to example embodiments of the present disclosure.

FIG. 4 depicts three example results for three different stabilization implementations. The first result 402 depicts a corrected image generated using partial-strength electronic image stabilization masking only. The second result 404 depicts a corrected image generated using full-strength electronic image stabilization masking. The third result 406 depicts a corrected image generated using deblur and tuned electronic image stabilization.

More specifically, all three images depict a corrected image generated after processing an image captured during camera motion. Each of the three results share the same input image that includes a background and a foreground with a sign. The sign includes an octagon to represent a stop sign with a hand and some text. The first result 402 can be generated by processing the image with partial-strength electronic image stabilization. The second result 404 can be generated by processing the image with full-strength electronic image stabilization. The third result 406 can be generated by processing the image with deblur and tuned electronic image stabilization. The depicted results can convey that in some implementations the reduction of electronic image stabilization masking strength paired with the deblurring techniques of the disclosed systems and methods may provide sharper and more accurate corrected images. In particular, as shown in 404, full-strength masking can make sharpness issues more evident while also causing shaping issues 408. The systems and methods disclosed herein can rely on sensor data and polynomial filters to generate a sharpening kernel that can be used to deblur and sharpen the image to provide for better shape consistency 410 with better image sharpness and deblur. The use of sensor data and polynomial filters can allow for a lessened need for electronic image stabilization masking.

Figure 5:
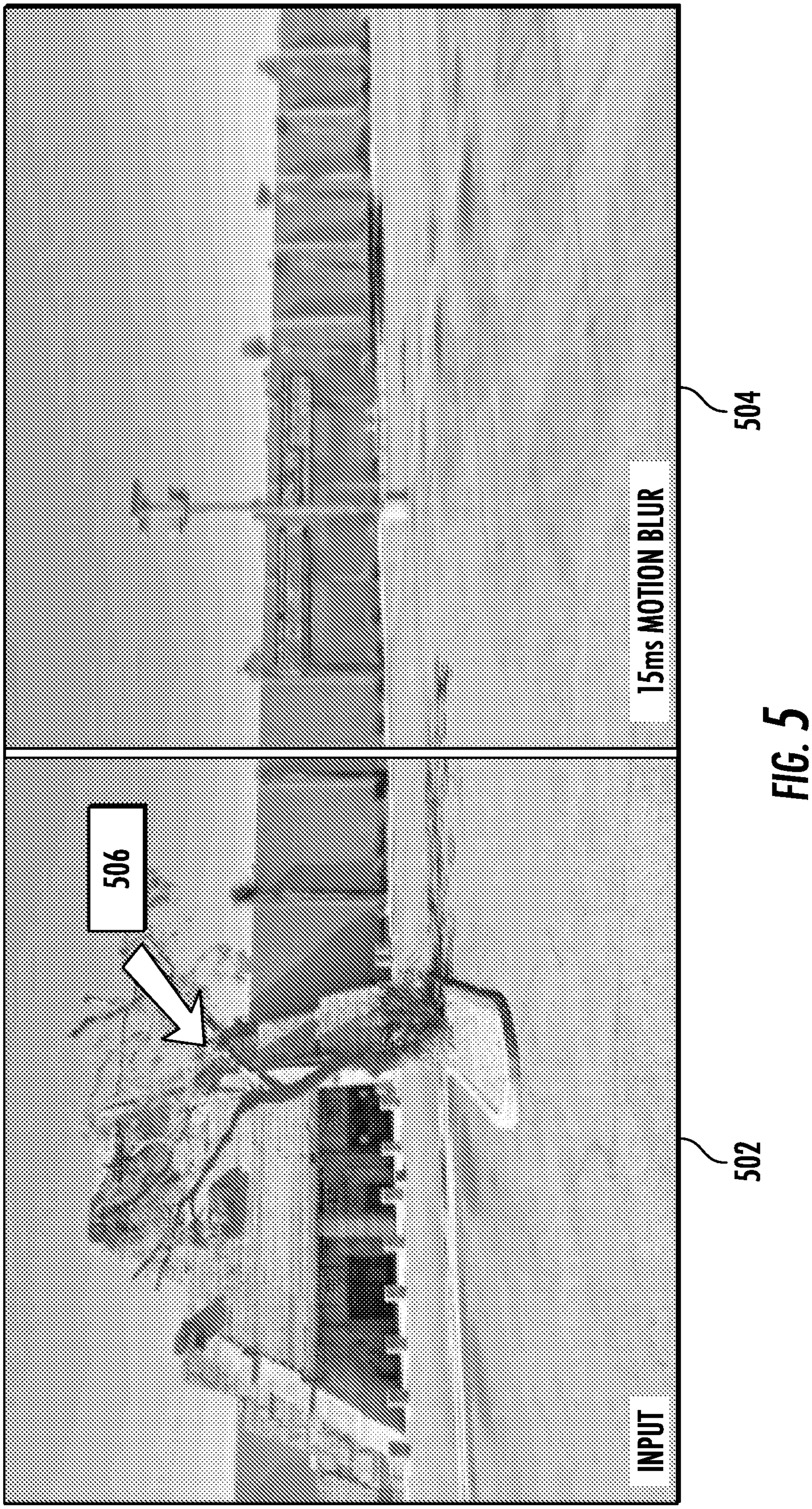
FIG. 5 depicts a block diagram of an example judder artifact mitigation according to example embodiments of the present disclosure.

FIG. 5 depicts an example motion blur addition to mitigate judder artifacts. In some implementations, the systems and methods disclosed herein can involve determining motion blur to add into the image and then adding the motion blur into the image to mitigate or eliminate judder artifacts. For example, in FIG. 5, the input image 502 is a corrected image that had been deblurred and stabilized, but the deblur and stabilization caused judder artifacts 506 to be more apparent in the image. Therefore, in order to mitigate the judder artifact 506, the systems and methods determined an amount of motion blur to add back into the image to generate the output image 504 that hides the judder artifacts caused by deblur and stabilization. In this implementation, a little bit of motion blur provided a better augmented image as it provided a more accurate scene.

Example Methods

FIG. 6 depicts a flow chart diagram of an example method to perform according to example embodiments of the present disclosure. Although FIG. 6 depicts steps performed in a particular order for purposes of illustration and discussion, the methods of the present disclosure are not limited to the particularly illustrated order or arrangement. The various steps of the method 600 can be omitted, rearranged, combined, and/or adapted in various ways without deviating from the scope of the present disclosure. A computing system is also provided, the computing system comprising: a plurality of sensors comprising one or more motion sensors and one or more image sensors: one or more processors: and one or more non-transitory computer-readable media that collectively store instructions that, when executed by the one or more processors, cause the computing system to perform the example method.

At 602, a computing system can generate sensor data, wherein the sensor data is descriptive of motion occurring during an exposure time. The motion data can include angular velocity data generated with one or more gyro sensors (e.g., gyroscope) and can include stabilization data generated with optical image stabilization sensors. The exposure time may be the exposure time for capturing an image. The sensor data can be generated by, or otherwise obtained from, one or more sensors of a computing system (which may be a computing device such as a mobile computing device). The sensor data can be descriptive of motion of one or more image sensors (or of an image capture device) of the computing system during the exposure time of the image.

At 604, the computing system can determine an estimated motion blur based on the sensor data. Estimating the motion blur can include processing the sensor data to determine a virtual pixel offset and mapping the virtual offset to the real world. The estimated motion blur can be used to determine or adjust masking strength for the motion blur masking. The determined estimated motion blur for the image can represent blur in the image due to the motion of the one or more image sensors (or image capture device) of the computing system during the exposure time (i.e., while the image was being captured).

At 606, the computing system can determine a motion blur kernel to correct motion blur for the image captured during the exposure time based on the estimated motion blur. In some implementations, the motion blur kernel can include a one-dimensional kernel.

At 608, the computing system can process the motion blur kernel with one or more polynomial filters to generate a sharpening kernel. The one or more polynomial filters can include a polynomial filter family of a third degree.

At 610, the computing system can obtain the image captured during the exposure time. The one or more images can be generated using one or more image sensors. The one or more images can be blurred and unstable due to at least one of camera motion or object motion. For example, object(s) within the scene being captured may move during the exposure time, causing the image(s) to become blurred.

At 612, the computing system can generate an augmented image by applying the sharpening kernel to the image. The augmented image may be a corrected image that has been deblurred and stabilized. Alternatively and/or additionally, the augmented image can be generated by applying the motion blur kernel and the motion blur masking to the image. The augmented image may be provided to a user. For example, the augmented image may be output for display to a user or transmitted to a computing device of the user.

Figure 7:
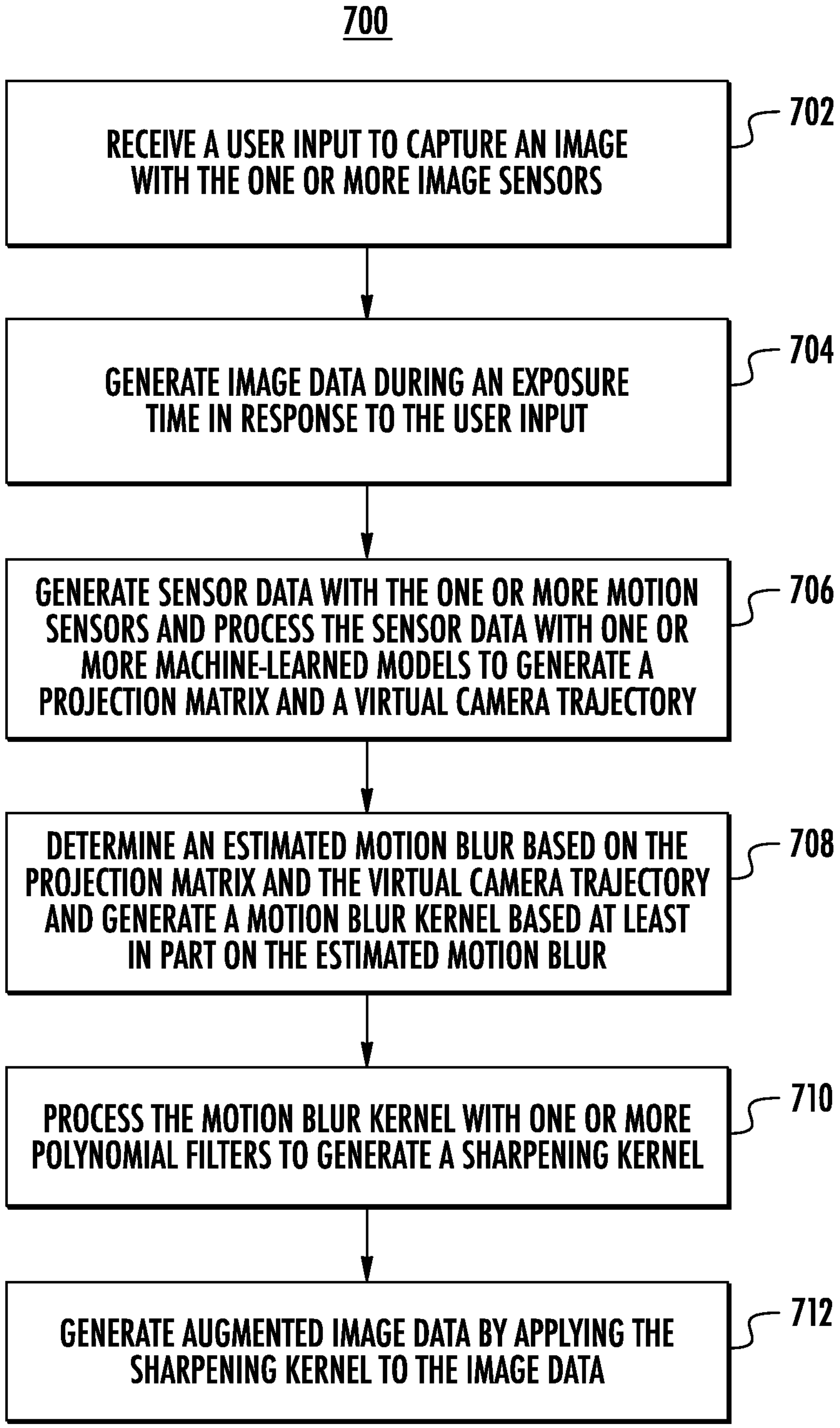
FIG. 7 depicts a flow chart diagram of an example method to perform image data augmentation according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure. A computing system is also provided, the computing system comprising: one or more sensors: one or more processors: and one or more non-transitory computer-readable media that collectively store instructions that, when executed by the one or more processors, cause the computing system to perform the example method. Also provided are one or more non-transitory computer-readable media that collectively store instructions that, when executed by one or more processors, cause a computing system to perform the example method.

At 702, a computing system can receive a user input to capture an image with the one or more image sensors. The user input can be a touch input to a touchscreen or may be a compression or actuation of a button. In some implementations, the user input can be a speech input captured by one or more audio sensors.

At 704, the computing system can generate image data during an exposure time in response to the user input. The image data can be generated with one or more image sensors. The image data can include one or more images that may be blurred and/or destabilized due to motion. The motion may be motion of the one or more image sensors and/or motion of one or more objects within a scene being captured.

At 706, the computing system can generate sensor data with the one or more motion sensors and process the sensor data with one or more machine-learned models to generate a projection matrix and a virtual camera trajectory.

At 708, the computing system can determine an estimated motion blur based on the projection matrix and the virtual camera trajectory and generate a motion blur kernel based at least in part on the estimated motion blur. The motion blur kernel can be a one-dimensional kernel. Motion blur masking strength can be adjusted based on the estimated motion blur and/or the projection matrix.

At 710, the computing system can process the motion blur kernel with one or more polynomial filters to generate a sharpening kernel. The sharpening kernel may include or be based on a non-blind polynomial deblur kernel (i.e., the kernel is known or estimated).

At 712, the computing system can generate augmented image data by applying the sharpening kernel to the image data. The augmented image data can include one or more corrected images. Alternatively and/or additionally, the augmented image data can be generated based on the motion blur masking strength and by applying the motion blur kernel to the image data.

Figure 8:
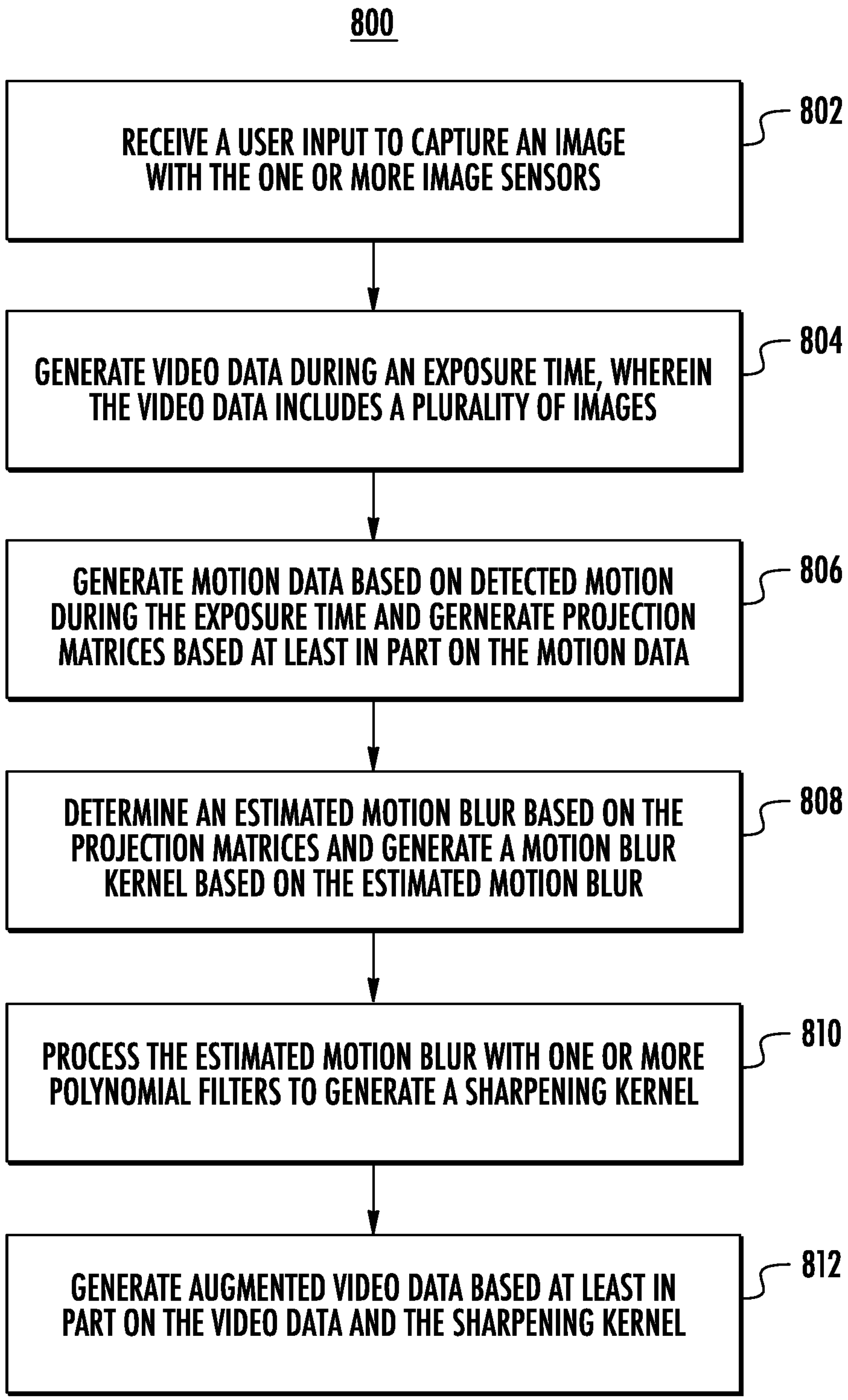
FIG. 8 depicts a flow chart diagram of an example method to perform video data augmentation according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure. A computing system is also provided, the computing system comprising: a plurality of sensors comprising one or more motion sensors and one or more image sensors: one or more processors: and one or more non-transitory computer-readable media that collectively store instructions that, when executed by the one or more processors, cause the computing system to perform the example method. Also provided are one or more non-transitory computer-readable media that collectively store instructions that, when executed by one or more processors, cause a computing system to perform the example method.

At 802, a computing system can receive a user input to capture an image with one or more image sensors. The image can be a frame in a video.

At 804, the computing system can generate video data during an exposure time, wherein the video data includes a plurality of images. The video data can include a video in which the plurality of images are frames for the video. The plurality of images can include blur due to camera motion.

At 806, the computing system can generate motion data based on detected motion during the exposure time and generate projection matrices based at least in part on the motion data.

At 808, the computing system can determine an estimated motion blur based on the projection matrices and generate a motion blur kernel based on the estimated motion blur.

At 810, the computing system can process the estimated motion blur with one or more polynomial filters to generate a sharpening kernel.

At 812, the computing system can generate augmented video data based at least in part on the video data and the sharpening kernel. The augmented video data can include a plurality of augmented images. The augmented video data can include stabilized and deblurred video data.

Figure 9:
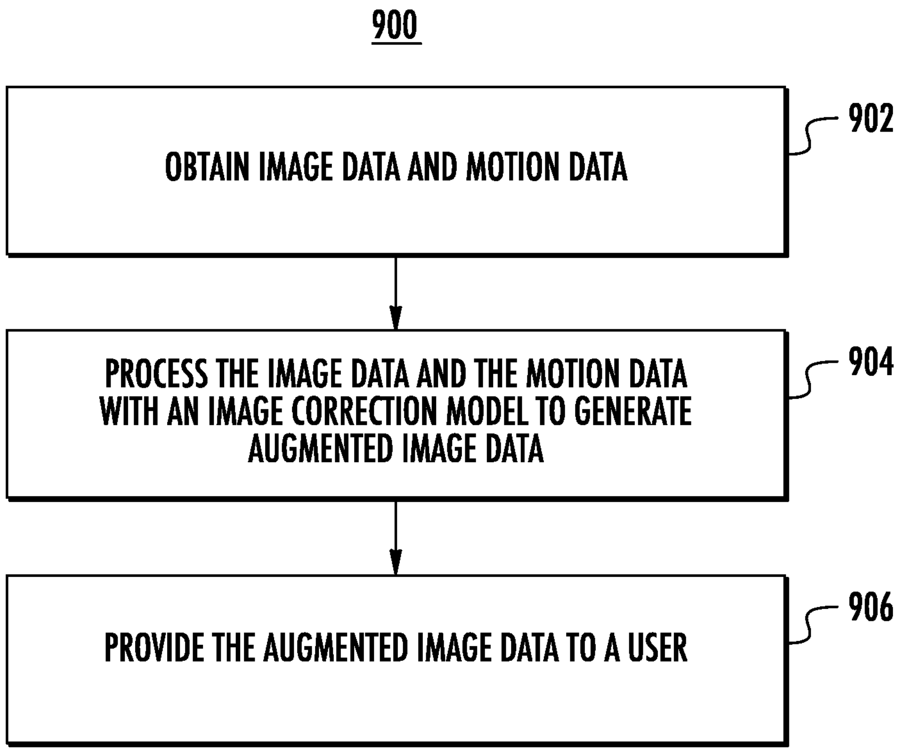
FIG. 9 depicts a flow chart diagram of an example method to perform image augmentation according to example embodiments of the present disclosure.

FIG. 9 depicts a flow chart diagram of an example method to perform according to example embodiments of the present disclosure. Although FIG. 9 depicts steps performed in a particular order for purposes of illustration and discussion, the methods of the present disclosure are not limited to the particularly illustrated order or arrangement. The various steps of the method 900 can be omitted, rearranged, combined, and/or adapted in various ways without deviating from the scope of the present disclosure. A computing system is also provided, the computing system comprising: one or more processors: and one or more non-transitory computer-readable media that collectively store instructions that, when executed by the one or more processors, cause the computing system to perform the example method. Also provided are one or more non-transitory computer-readable media that collectively store instructions that, when executed by one or more processors, cause a computing system to perform the example method.

At 902, a computing system can obtain image data and motion data. The motion data can be sensor data generated with one or more motion sensors. The motion sensors can include a gyro sensor for generating angular velocity data and an optical image stabilization sensor for generating stabilization data.

At 904, the computing system can process the image data and the motion data with an image correction model to generate augmented image data. The image data can include one or more images (captured during an exposure time), and the augmented image data can include one or more augmented images. The image correction model can be a blur refinement model. In some implementations, the image correction model can include a camera motion model, a blur status model, and an image convolution model. The image correction model can be trained to estimate motion blur based on the motion data. The image correction model can be further trained to use the estimated motion blur to generate a motion blur kernel, which can then be used to generate a sharpening kernel.

At 906, the computing system can provide the augmented image data to a user. The one or more augmented images can include one or more corrected images. In some implementations, the augmented images can be provided for display on a visual display and may be provided as part of a user interface of a camera or photo application.

Figure 10:
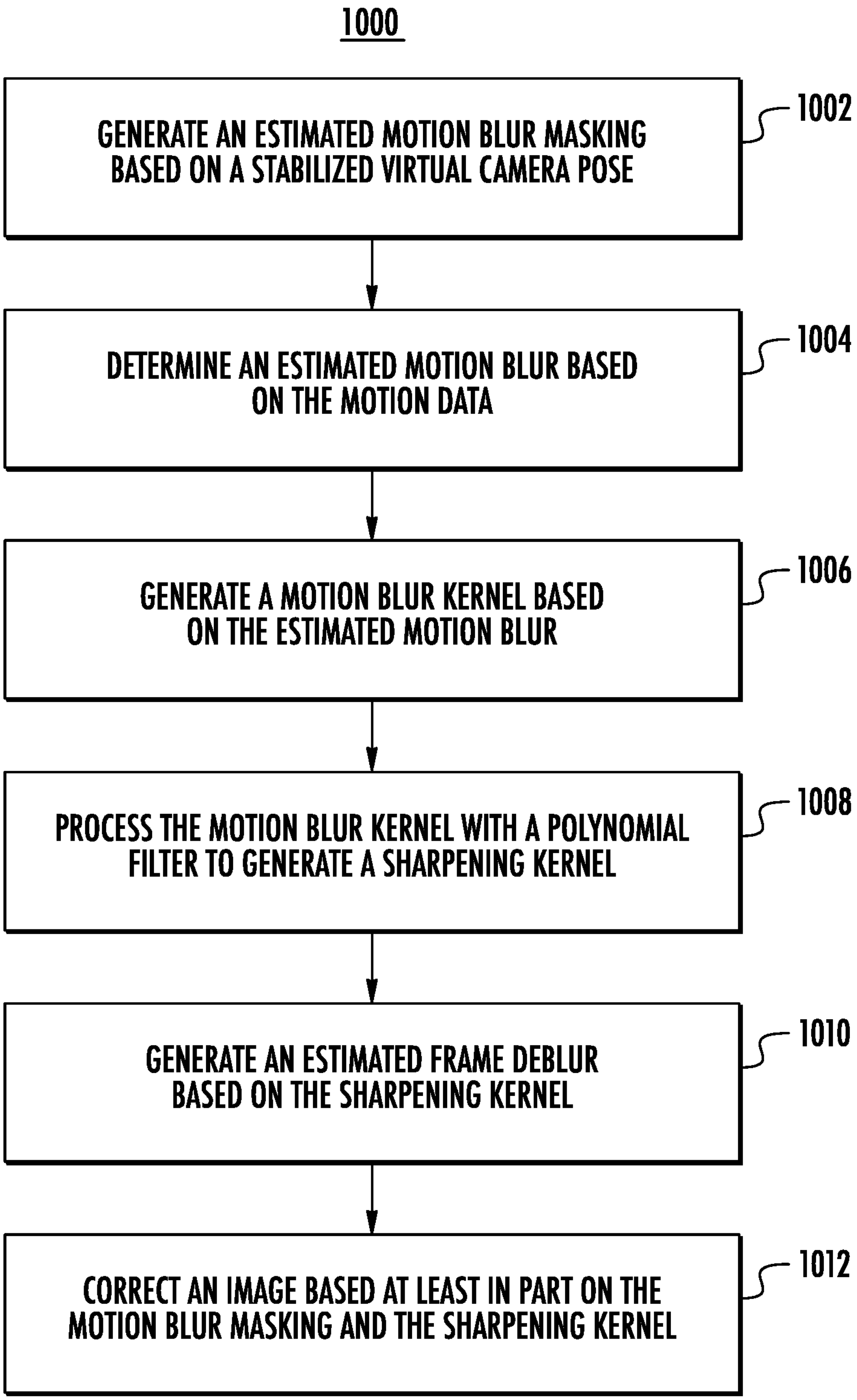
FIG. 10 depicts a flow chart diagram of an example method to perform image correction according to example embodiments of the present disclosure.

FIG. 10 depicts a flow chart diagram of an example method to perform according to example embodiments of the present disclosure. Although FIG. 10 depicts steps performed in a particular order for purposes of illustration and discussion, the methods of the present disclosure are not limited to the particularly illustrated order or arrangement. The various steps of the method 1000 can be omitted, rearranged, combined, and/or adapted in various ways without deviating from the scope of the present disclosure. A computing system is also provided, the computing system comprising: one or more processors: and one or more non-transitory computer-readable media that collectively store instructions that, when executed by the one or more processors, cause the computing system to perform the example method. Also provided are one or more non-transitory computer-readable media that collectively store instructions that, when executed by one or more processors, cause a computing system to perform the example method.

At 1002, a computing system can generate an estimated motion blur masking based on a stabilized virtual camera pose. The estimated motion blur masking can involve electronic image stabilization.

At 1004, the computing system can determine an estimated motion blur based on the motion data. The estimated motion blur can be determined by mapping virtual offset to the real world.

At 1006, the computing system can generate a motion blur kernel based on the estimated motion blur. The motion blur kernel can be used for image correction such as image deblur.

At 1008, the computing system can process the motion blur kernel with a polynomial filter to generate a sharpening kernel. The sharpening kernel can be a polynomial deblur kernel.

At 1010, the computing system can generate an estimated frame deblur based on the sharpening kernel.

At 1012, the computing system can correct an image based at least in part on the motion blur masking and the sharpening kernel. In some implementations, the motion blur masking can be reduced based on the use of the sharpening kernel. In some implementations, motion may be added back into the image data to mitigate or eliminate judder artifacts.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for improved deblurring of an image, the method comprising:

generating, by a computing system comprising one or more processors and one or more sensors, sensor data, wherein the sensor data is descriptive of motion occurring during an exposure time of the image;

determining, by the computing system, an estimated motion blur for the image based on the sensor data;

determining, by the computing system, masking strength for motion blur masking based on the estimated motion blur;

determining, by the computing system, a motion blur kernel to correct motion blur for the image captured during the exposure time based on the estimated motion blur;

processing, by the computing system, the motion blur kernel with one or more polynomial filters to generate a sharpening kernel, wherein the sharpening kernel comprises one or more terms for controlling at least one of frequency amplification or noise amplification; and generating, by the computing system, an augmented image by applying the sharpening kernel and the motion blur masking to the image.

2. The computer-implemented method of claim 1, wherein the one or more sensors comprise one or more gyro sensors and wherein the sensor data comprises angular velocity data.

3. The computer-implemented method of claim 1, wherein the one or more sensors comprise one or more optical image stabilization sensors;

wherein the sensor data comprises optical image stabilization data; and wherein determining an estimated motion blur comprises generating a two-dimensional pixel offset based at least in part on the optical image stabilization data.

4. The computer-implemented method of claim 1, wherein generating the augmented image comprises:

determining, by the computing system, a motion blur offset based at least in part on the estimated motion blur; and generating, by the computing system, the augmented image based at least in part on the motion blur offset.

5. The computer-implemented method of claim 1, further comprising:

providing, by the computing system, the augmented image to a user.

6. The computer-implemented method of claim 1, further comprising:

generating, by the computing system, an augmented video based at least in part on the image and the sharpening kernel, wherein the augmented video comprises the augmented image; and wherein the image comprises a frame of a video.

7. The computer-implemented method of claim 1, further comprising: processing, by the computing system, the motion blur kernel to generate a non-blind polynomial deblur kernel, wherein the sharpening kernel is generated based on the non-blind polynomial deblur kernel.

8. The computer-implemented method of claim 1, wherein the motion blur kernel comprises a maximum kernel size of thirty.

9. A computing system, the system comprising:

a plurality of sensors comprising one or more motion sensors and one or more image sensors;

one or more processors; and one or more non-transitory computer-readable media that collectively store instructions that, when executed by the one or more processors, cause the computing system to perform operations, the operations comprising:

receiving a user input to capture an image with the one or more image sensors;

generating image data during an exposure time in response to the user input;

generating sensor data with the one or more motion sensors;

processing the sensor data with one or more machine-learned models to generate a projection matrix and a virtual camera trajectory;

determining an estimated motion blur based on the projection matrix and the virtual camera trajectory;

generating a motion blur kernel based at least in part on the estimated motion blur;

generating a joint kernel comprising the motion blur kernel to reduce judder effect and a sharpening kernel for camera motions along directions other than a main panning direction;

adjusting motion blur masking strength based at least in part on the projection matrix; and generating augmented image data based on the motion blur masking strength and by applying the joint kernel to the image data.

10. The computing system of claim 9, wherein the sensor data comprises motion data and stabilization data; and wherein generating the sensor data comprises:

generating motion data with a gyro event handler, wherein the motion data is descriptive of motion during the exposure time with the one or more motion sensors, wherein the gyro event handler continuously fetches the sensor data from the one or more motion sensors and estimates a latest camera pose; and generating stabilization data with an optical image stabilization shift handler, wherein the optical image stabilization shift handler continuously fetches optical image stabilization data and converts the optical image stabilization data into a two-dimensional pixel offset.

11. The computing system of claim 9, wherein the operations further comprise:

processing the motion blur kernel with one or more polynomial filters to generate the sharpening kernel; and wherein generating the augmented image data comprises applying the sharpening kernel to the image data, and wherein the one or more polynomial filters are calculated by repeated convolution of a linear kernel.

12. One or more non-transitory computer-readable media that collectively store instructions that, when executed by one or more processors, cause a computing system to perform operations, the operations comprising:

obtaining image data and motion data, wherein the image data comprises an image captured during an exposure time, and wherein the motion data is descriptive of a camera motion during the exposure time;

processing the image data and the motion data with an image correction model to generate augmented image data, wherein the augmented image data comprises an augmented image, wherein the image correction model is trained to:

generate an estimated motion blur masking based on a stabilized virtual camera pose;

generate an estimated frame deblur based on a motion blur kernel to generate a sharpening kernel using one or more polynomial filters, wherein the sharpening kernel comprises at least one of a frequency amplifier or a noise amplifier for frequencies that are attenuated by blur; and correct an image based at least in part on the estimated motion blur masking and the sharpening kernel; and providing the augmented images to a user.

13. The one or more non-transitory computer-readable media of claim 12, wherein the image data comprises a plurality of images, and wherein the augmented image data comprises a plurality of augmented images.

14. The one or more non-transitory computer-readable media of claim 12, wherein the motion data is generated with one or more motion sensors, and wherein the one or more motion sensors comprise a gyro sensor and an optical image stabilization sensor.

15. The one or more non-transitory computer-readable media of claim 12, wherein the image correction model is trained to generate projection matrices based at least in part on the motion data, wherein the projection matrices is a two-dimensional projection matrices; and wherein determining an estimated motion blur comprises:

mapping the image data to the projection matrices to determine the estimated motion blur; and wherein the estimated frame deblur is generated based at least in part on the estimated motion blur.

16. The one or more non-transitory computer-readable media of claim 12, wherein the image correction model is further trained to:

process the motion blur kernel with the one or more polynomial filters to generate the sharpening kernel; and wherein generating the augmented image comprises applying the sharpening kernel to the image, and wherein the sharpening kernel is generated to enhance a temporal sharpness of the video data.

17. The one or more non-transitory computer-readable media of claim 12, wherein the motion blur kernel comprises an upper bound that limits an allowable computational time allowed.

18. The one or more non-transitory computer-readable media of claim 12, wherein the image correction model is further trained to:

process the motion blur kernel with the one or more polynomial filters to generate the sharpening kernel; and wherein generating the augmented image comprises applying the sharpening kernel to the image, and wherein the one or more polynomial filters comprises a polynomial filter family of a third degree.

19. The one or more non-transitory computer-readable media of claim 12, wherein the image correction model is further trained to:

reduce motion blur masking strength based on the estimated motion blur.

* * * * *